Sept. 13, 1938.　　　　E. J. HOUDRY　　　　2,129,693
CATALYSIS
Filed Aug. 27, 1935
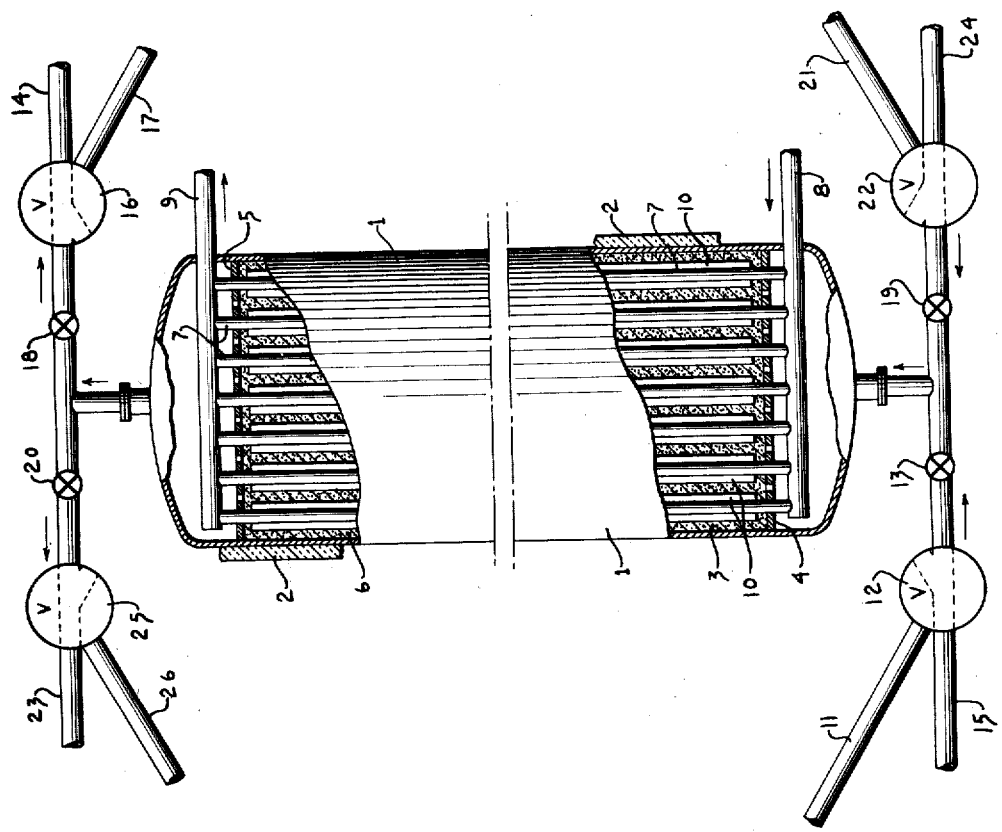
INVENTOR
Eugene J. Houdry
BY
Ira L. Nickerson
ATTORNEY Patented Sept. 13, 1938

2,129,693

UNITED STATES PATENT OFFICE 2,129,693

CATALYSIS

Eugene J. Houdry, Rosemont, Pa., assignor to Houdry Process Corporation, Dover, Del., a corporation of Delaware Application August 27, 1935, Serial No. 38,027

7 Claims. (Cl. 196—52)

This invention relates to catalysis and especially but not exclusively to catalytic operations or cycles which involve separate and distinct reactions effected usually under different operating conditions. For example, one reaction in the cycle may be endothermic while the following or second reaction is exothermic. Such cycles normally occur when a catalyst accumulates a contaminating deposit during an on-stream or transforming or treating operation, which deposit progressively interferes with or stops the operation and must be removed in a subsequent regenerating or reactivating operation to prepare the catalyst for another on-stream operation. The reactions in either part of the cycle may be endothermic or exothermic but when the regeneration is effected by oxidation or combustion of the contaminating deposit the reaction is strongly exothermic.

Insofar as the claims of the present invention may involve subject matter in common with that disclosed by my copending application Serial Number 71,341, filed March 27, 1936 (continuation in part of my application Serial Number 512,466, filed June 30, 1931), the present application may be considered as a further development of said copending application.

When a contact mass does not contain oxidizing material it is often difficult to start the oxidizing reaction. Combustion may start in some parts of the mass and not in other parts, thus upsetting the temperature control of the mass, prolonging the regenerating operation and usually producing a poorly regenerated mass. Moreover, to effect a reasonably thorough regeneration it may be necessary to carry the temperature so high as to endanger if not actually to impair the activity of the contact mass especially when the latter is composed in whole or in part of silicious or other highly heat sensitive material. To improve or to remedy this situation I have proposed in my copending application Serial No. 35,101, filed August 7, 1935 (issued as Patent No. 2,078,951 on May 4, 1937), to incorporate in such a mass a sufficient quantity of suitable material to promote combustion at a relatively low temperature, to produce faster burning and to effect the removal of as much or more of the deposit at a considerably lower temperature. Among the materials useful for this purpose, as indicated in my copending application, are metals or metallic compounds from a group which includes nickel, copper, cobalt, chromium, iron and manganese. Unfortunately, in many instances the promoters have an adverse effect upon the on-stream or transforming operation of the cycle and upon the nature and extent of the resulting products. For example, in the catalytic conversion or cracking of mineral oil, a number of such promoters among which are nickel, copper, cobalt and chromium, even when present in relatively minute amounts, as of the order of one-half of one percent and less, adversely affect the quality of the product and in addition produce unduly large quantities of gas and coke thereby reducing the yield.

One object of the invention is to render a component or certain components of a contact mass inoperative for a particular reaction. Another object is to render such a component inoperative in one reaction and to utilize it for a second reaction, as when the catalytic or other contact mass is employed in a two phase cycle. Other objects will be apparent from the detailed description which follows.

When a contact mass is unduly active or manifests a certain degree of activity in an undesirable direction, I have found that it is possible to mitigate such activity in many instances without making structural changes in the contact mass. This is especially the case when the components manifesting the extreme or misdirected activity are metals or metallic compounds naturally in the mass or put there accidentally or by design. It is well known that naturally occurring minerals such as earths, clays, ores, pumice, etc. are utilized directly for contact masses either alone or blended, or as basic material to be subjected to purification and various degrees and kinds of chemical treatments by acids, alkalies, etc. for the production of contact masses. Blends of silica and alumina from natural or treated clays with or without admixture of other active or inactive materials including finely divided metals and metallic compounds are utilized to produce absorbent and adsorptive contact masses of controlled activity useful in the promotion of many reactions and have a particular value in the transformation and treatment of hydrocarbons such as mineral oil, its distillates and residues, to produce a wide range of valuable products. Inasmuch as the component producing the undesirable effect for a given reaction may be difficult of removal or impossible to remove without impairing the contact mass otherwise, as in structure or in function, and since the component may be highly desirable in promoting a subsequent reaction, the present invention involves the "poisoning" or reduction of activity of such component or its modification to a more favorable form; it also involves, as indicated previously, its restoration to activity when needed for a subsequent reaction.

The poisoning of the component is effected in advance of the reaction in which it is desired that the component be substantially inactive by passing through the mass a suitable substance which will react with the component while having little or no deleterious effect upon the remainder of the mass. For example, in the catalytic cracking of heavier petroleum distillates and residues to produce lighter hydrocarbons in the gasoline boiling range it is desirable to use silicious catalytic masses, such as activated hydrosilicate of alumina having a silica to alumina ratio of 3½:1 or greater, which contain metals or metallic compounds naturally or incorporated therein by design, as disclosed in my copending application Serial No. 600,581, filed March 23, 1932 (issued as Patent No. 2,078,945 on May 4, 1937), and in my aforesaid copending application Serial No. 35,101 (Patent No. 2,078,951), wherein incorporated metals or metallic compounds serve as promoters of regeneration by combustion. Such promoters may be changed to a relatively inactive form from a catalytic angle by passing through the contact mass hydrogen sulphide, organic sulphides, such as methyl or ethyl sulphide, mercaptans (RSH), thioethers (RSR), various similar selenium bearing gases capable of forming metal compounds with a suitable degree of stability, or other fluids capable of converting the metallic oxides into an inactive form, or to a form in which they will no longer produce substantial amounts of gaseous products, or such that if they have any activity in the changed form, they will tend to produce only products of the type desired, i. e. for example, liquids such as gasoline, or cracking stock, as the case may be. Hydrogen sulphide is a preferred material because it readily converts the oxides of metals to sulphides of comparatively slight or no activity, is cheap and readily available, and forms sulphides which can be easily reconverted to the active, oxide form. The promoter will remain inactive or relatively inactive during the period of conversion. When regeneration is initiated, the oxygen bearing gas employed will usually reconvert the metal from the inactive sulphide to the active form, thereby to make the metal useful as a promoter during regeneration.

As illustrated above, there are many other poisoning agents besides hydrogen sulphide which are operable. All such are contemplated, whether the promoter be converted to a sulphide or any other inactive form, so long as the poisoning agent does not harmfully affect the main body of the contact mass. However, where certain poisoning agents are employed, there are formed compounds of such stability that they cannot readily be reconverted to their original form by means of air or other oxygen bearing gases employed in regeneration. In such cases, a preliminary blowing with steam or hydrogen, or treatment with other materials may be required, depending upon the particular poisoning agent employed and the compounds formed, in order to expeditiously reconvert the promoter. Even in the case of some sulphides, some steam, introduced with the air, is useful in returning the promoter to its previous or other active form.

The poisoning agent must be sufficiently stable so that it can be used and yet not so stable that it will not readily react with the temporarily undesirable component of the contact mass to form a compound which is at least relatively inactive in the contacting or catalytic action. Also it must be so chosen that, when the poisoning reaction occurs, the products of the reaction, other than the compound, will remain in a fluid and preferably in a vaporous or gaseous state under the conditions of partial pressure which obtain, so as to be readily removable before the catalytic operation.

Since the present invention involves a principle of catalysis, it is obviously capable of wide application. Materials and compounds heretofore of little or no use as catalysts by reason of their tendency to produce extreme or secondary or divergent reactions, which tendency was uncontrollable or controlled only with great difficulty, can now be utilized to advantage after "poisoning" or partly "poisoning" the extremely active components, regardless of whether such components are subsequently restored to full or partial activity for the same or a different reaction.

Illustrative of one specific type of apparatus for carrying out my invention, reference is made to the accompanying drawing in which 1 is a casing or converter which may be insulated with any suitable material 2. Reaction chamber 3 within the converter is bounded by lower perforated sheet member or support 4 and upper perforated sheet 5 and contains a layer or body of contact mass or catalytic material 6. Heat exchange tubular members 7 extend throughout the length or height of the reaction chamber, heat exhange fluid being introduced thereinto, for example, through line 8 and withdrawn therefrom through line 9. Fins 10 extend from the tubes 7 into the contact or catalytic material. Reactants, e. g. hydrocarbons in the form of vaporous mineral oil such as a gas oil, may be introduced through line 11 and valves 12 and 13 into the lower end of the manifolding chamber of converter 1. The reactants then pass through the perforations or openings in sheet 4 and upwardly through and in contact with catalyst or contact material 6, which may, for example, be an adsorptive contact material such as a blend of silica and alumina having present therein a small amount of a regeneration promoter such as one of the metals from the group manganese, nickel, copper, cobalt and chromium, depending upon the specific character of the reactants and type of reaction desired. Products of reaction pass from the contact material 6 through the openings in the upper sheet member 5 and leave the converter through line 14.

When the on-stream period or conversion of reactants has been conducted long enough so that the products of reaction change in character or drop in quality to an appreciable extent, due to the accumulation of contaminants or combustible deposits on the catalytic material 6, valve 12 may be turned or adjusted to permit steam or hydrogen or other suitable fluid to pass therethrough from line 15. The function of the fluid passing through the reaction chamber from line 15 is to convert the regeneration promoter in the catalytic material, normally a metalliferous material, to a chemical form in which the same is capable of actively promoting oxidation during the step of regeneration. Passage of this fluid is usually continued for a relatively short interval as compared with the length of the on-stream period and the fluids leaving the upper end of the reaction chamber during this step may, by the adjustment of valve 16, be withdrawn through branch line 17, thus avoiding dilution or contamination of the reactants.

Next valves 13 and 18 may be closed and valves 19 and 20 opened and a regenerating medium such as air or other oxygen-containing fluid passed through line 21 and valve 22 into the lower end of converter 1, fumes or products of regeneration being withdrawn from the upper end of the converter and led away through line 23.

When the regeneration step is completed, as will be evident from the chemical nature of the regeneration fumes, the oxidation promoter within the catalytic material 6 is again changed into a relatively inactive chemical compound form, and another on-stream reaction or transformation of hydrocarbons is carried out. The reconversion of the oxidation promoter from active to relatively inactive form may be accomplished by the proper adjustment of valve 22 and by the passage of a suitable fluid, usually a gas, from line 24 into the lower end of converter 1. Such gas, may, for example, be a sulphurous material such as hydrogen sulphide, mercaptans, etc., depending upon circumstances. Outgoing gases from this step may be withdrawn from the upper end of the converter and, by proper adjustment of the valve 25, led away through line 26.

Valves 19 and 20 may now be closed and valves 13 and 18 again opened and hydrocarbon reactants again passed into the converter from line 11, thus initiating another cycle of operation. These cycles of operation may be repeated over and over indefinitely.

Of course the various elements of apparatus shown are only illustrative and other types and embodiments of apparatus for carrying out a contact or catalytic process of the type herein described are likewise contemplated.

I claim as my invention:

1. In a process for the treatment of fluid reactants comprising hydrocarbons substantially free of other or extraneous reactant fluid with a bed of solid contact or catalytic mass which is alternately on-stream to effect the desired treatment or transformation of reactants and in regeneration to remove combustible deposits or contaminants which accumulate on said mass during the on-stream period, the steps which comprise maintaining in said mass a relatively small amount of a metalliferous material capable of acting as a promoter for regeneration in some readily convertible form and which has an adverse effect on the desired on-stream reaction, maintaining said material during the regeneration periods, during which an oxygen containing regenerating medium is fed through said mass, in such chemical form that it is capable of promoting the regeneration, and throughout substantially the entire duration of each of the on-stream periods maintaining said material in a different and relatively inactive chemical compound form so as to minimize its catalytic effect on the desired on-stream reaction.

2. In a contact or catalytic process for effecting the treatment or conversion of fluid reactants composed of hydrocarbons substantially free of other or extraneous reactant fluid with a bed of adsorptive silicious contact or catalytic material or mass to produce hydrocarbon products of substantially different boiling range characteristics, said mass being alternately on-stream to effect the desired treatment or transformation of reactants and in regeneration to remove combustible deposits or contaminants which accumulate on said mass during the on-stream periods, the steps which comprise maintaining in said mass a relatively small amount of metalliferous material capable of acting as a promoter for regeneration in some readily convertible form but which has an adverse catalytic effect on the desired on-stream reaction, maintaining said material during the regeneration periods, during which an oxygen-containing regeneration medium is fed through said bed, in such chemical form that it is capable of actively promoting the regeneration, and throughout substantially the entire duration of each of the on-stream periods maintaining said material in such a different and relatively inactive chemical compound form as to minimize its adverse effect on the desired on-stream reaction.

3. In a process for the production of lower boiling hydrocarbons by the endothermic transformation of higher boiling fluid hydrocarbon reactants with a bed of adsorptive contact material or mass comprising a blend of silica and alumina which is alternately on-steam to effect the desired treatment or transformation of reactants and in regeneration to remove combustible contaminants or deposits which accumulate on said mass during the on-stream periods, the steps which comprise maintaining in said mass a relatively small amount of a metalliferous material capable of acting as a promoter of regeneration in some readily convertible form and which has an adverse catalytic effect on the desired on-stream reaction, during the regeneration periods maintaining said metalliferous material in such chemical form that it is capable of promoting the regeneration while an oxygen-containing regenerating medium is passed through said bed or mass, and throughout substantially the entire duration of each of the on-stream periods maintaining said material in such a different and relatively inactive chemical compound form as to minimize its adverse effect on the desired on-stream reaction.

4. In a contact or catalytic process for treating or transforming fluid reactants composed of hydrocarbons substantially free of other or extraneous reactant fluid by the action of a porous adsorptive mass requiring periodic regeneration by oxidation to remove carbonaceous and other burnable deposits which accumulate on said mass during alternate on-stream periods, the mass comprising essentially a blend of silica and alumina having incorporated therewith relatively small amounts of metalliferous material capable of acting as a promoter for regeneration in some readily convertible form and which has an adverse catalytic effect upon the on-stream or transforming step, the process steps which comprise preliminary to each on-stream period subjecting the catalytic mass to a treatment with a fluid substance capable of converting the said metalliferous material into a substantially inactive chemical compound form, the substance being from the group composed of hydrogen sulphide, organic sulphides including methyl and ethyl sulphides, mercaptans, thioethers, and selenium bearing gases, then stopping the flow of said substance and passing the hydrocarbon reactants through the contact mass to effect the desired treatment or transformation thereof, whereupon combustible deposits accumulate on said mass, then restoring the metallic compounds to active form for promoting regeneration by a preliminary blowing with a fluid containing steam, then regenerating the mass by feeding thereto an oxygen bearing fluid to burn out contaminating deposits, and repeating the above steps.

5. Process as defined in the preceding claim further characterized in that the said metalliferous materials capable of acting as promoters for regeneration are restored to active form following the on-stream periods and preceding each period of regeneration by blowing the mass with a fluid comprising hydrogen.

6. In a process for the treatment of fluid hydrocarbon reactants to effect an endothermic conversion thereof to lower boiling hydrocarbons with a bed of silicious contact mass which is alternately on-stream to effect the desired treatment or transformation and in regeneration to remove combustible contaminants or deposits, the steps which comprise maintaining in said mass a relatively small amount of a metalliferous material capable of acting as a promoter of regeneration in some readily convertible form, said material having its metal component from the group consisting of iron, manganese, nickel, copper and cobalt; during the regeneration periods maintaining said metalliferous material substantially in the form of metal oxide while passing an oxygen-containing regenerating medium through said mass; when said mass is sufficiently regenerated, stopping the flow of regenerating medium through the mass and passing therethrough a sulphurous gas capable of converting metal oxide to metal sulphide; stopping the flow of said sulphurous gas when said metal oxide is converted to metal sulphide and then passing hydrocarbon reactants therethrough, continuing the flow of said hydrocarbon reactants until the character of the treatment or conversion depreciates to an unacceptable point due to accumulation on said mass of combustible deposits or contaminants; then stopping the flow of reactants, reconverting said metal sulphide to metal oxide and again passing an oxygen-containing regenerating medium therethrough; and repeating the above steps of process.

7. In a process for the treatment of high boiling fluid hydrocarbon reactants to effect an endothermic conversion thereof to lower boiling hydrocarbons with a bed of adsorptive contact or catalytic mass comprising a blend of silica and alumina, said mass being alternately on-stream to effect the desired treatment or transformation and in regeneration to remove combustible contaminants or deposits, the steps which comprise maintaining in said mass a relatively small amount of a metalliferous material capable of acting as a promoter of regeneration in some readily convertible form, said material having its metal component from the group consisting of iron, manganese, nickel, copper and cobalt; during the regeneration periods maintaining said metalliferous material substantially in the form of metal oxide while passing an oxygen-containing regenerating medium through said mass; when said mass is sufficiently regenerated stopping the flow of regenerating medium through the mass and passing hydrogen sulphide gas therethrough so as to effect a conversion of metal oxide contained in said catalytic mass to metal sulphide; stopping the flow of said hydrogen sulphide when said metal oxide is converted to metal sulphide and then passing hydrocarbon reactants therethrough, continuing the flow of said hydrocarbon reactants until the character of the treatment or conversion depreciates to an unacceptable point due to accumulation on said mass of combustible deposits or contaminants; then stopping the flow of reactants, passing through said mass a fluid capable of reconverting said metal sulphide to metal oxide, and again passing through said mass a regenerating medium containing oxygen; and repeating the aforesaid steps of process, whereupon a high rate of regeneration is had for any given temperature and the conversion of reactant hydrocarbons is not substantially adversely effected due to the presence of the metalliferous promoter of regeneration.

EUGENE J. HOUDRY.

CERTIFICATE OF CORRECTION.

Patent No. 2,129,693.                September 13, 1938.

EUGENE J. HOUDRY.

It is hereby certified that error appears in the printed specification of the above numbered patent requiring correction as follows: Page 2, second column, line 34, for "exhange" read exchange; and page 3, second column, line 23, claim 3, for "on-steam" read on-stream; and that the said Letters Patent should be read with this correction therein that the same may conform to the record of the case in the Patent Office.

Signed and sealed this 25th day of October, A. D. 1938.

Henry Van Arsdale (Seal)                           Acting Commissioner of Patents.

thereto an oxygen bearing fluid to burn out contaminating deposits, and repeating the above steps.

5. Process as defined in the preceding claim further characterized in that the said metalliferous materials capable of acting as promoters for regeneration are restored to active form following the on-stream periods and preceding each period of regeneration by blowing the mass with a fluid comprising hydrogen.

6. In a process for the treatment of fluid hydrocarbon reactants to effect an endothermic conversion thereof to lower boiling hydrocarbons with a bed of silicious contact mass which is alternately on-stream to effect the desired treatment or transformation and in regeneration to remove combustible contaminants or deposits, the steps which comprise maintaining in said mass a relatively small amount of a metalliferous material capable of acting as a promoter of regeneration in some readily convertible form, said material having its metal component from the group consisting of iron, manganese, nickel, copper and cobalt; during the regeneration periods maintaining said metalliferous material substantially in the form of metal oxide while passing an oxygen-containing regenerating medium through said mass; when said mass is sufficiently regenerated, stopping the flow of regenerating medium through the mass and passing therethrough a sulphurous gas capable of converting metal oxide to metal sulphide; stopping the flow of said sulphurous gas when said metal oxide is converted to metal sulphide and then passing hydrocarbon reactants therethrough, continuing the flow of said hydrocarbon reactants until the character of the treatment or conversion depreciates to an unacceptable point due to accumulation on said mass of combustible deposits or contaminants; then stopping the flow of reactants, reconverting said metal sulphide to metal oxide and again passing an oxygen-containing regenerating medium therethrough; and repeating the above steps of process.

7. In a process for the treatment of high boiling fluid hydrocarbon reactants to effect an endothermic conversion thereof to lower boiling hydrocarbons with a bed of adsorptive contact or catalytic mass comprising a blend of silica and alumina, said mass being alternately on-stream to effect the desired treatment or transformation and in regeneration to remove combustible contaminants or deposits, the steps which comprise maintaining in said mass a relatively small amount of a metalliferous material capable of acting as a promoter of regeneration in some readily convertible form, said material having its metal component from the group consisting of iron, manganese, nickel, copper and cobalt; during the regeneration periods maintaining said metalliferous material substantially in the form of metal oxide while passing an oxygen-containing regenerating medium through said mass; when said mass is sufficiently regenerated stopping the flow of regenerating medium through the mass and passing hydrogen sulphide gas therethrough so as to effect a conversion of metal oxide contained in said catalytic mass to metal sulphide; stopping the flow of said hydrogen sulphide when said metal oxide is converted to metal sulphide and then passing hydrocarbon reactants therethrough, continuing the flow of said hydrocarbon reactants until the character of the treatment or conversion depreciates to an unacceptable point due to accumulation on said mass of combustible deposits or contaminants; then stopping the flow of reactants, passing through said mass a fluid capable of reconverting said metal sulphide to metal oxide, and again passing through said mass a regenerating medium containing oxygen; and repeating the aforesaid steps of process, whereupon a high rate of regeneration is had for any given temperature and the conversion of reactant hydrocarbons is not substantially adversely effected due to the presence of the metalliferous promoter of regeneration.

EUGENE J. HOUDRY.

CERTIFICATE OF CORRECTION.

Patent No. 2,129,693.  September 13, 1938.

EUGENE J. HOUDRY.

It is hereby certified that error appears in the printed specification of the above numbered patent requiring correction as follows: Page 2, second column, line 34, for "exhange" read exchange; and page 3, second column, line 23, claim 3, for "on-steam" read on-stream; and that the said Letters Patent should be read with this correction therein that the same may conform to the record of the case in the Patent Office.

Signed and sealed this 25th day of October, A. D. 1938.

Henry Van Arsdale (Seal)  Acting Commissioner of Patents.